(12) United States Patent
Nijsen

(10) Patent No.: US 9,334,990 B2
(45) Date of Patent: May 10, 2016

(54) COUPLING DEVICE FOR A TUBE

(75) Inventor: Andreas Jacobus Louis Nijsen, Enschede (NL)

(73) Assignee: GEORG FISCHER WAGA N.V., Epe (NL)

( * ) Notice: Subject to any disclaimer, the term of this patent is extended or adjusted under 35 U.S.C. 154(b) by 205 days.

(21) Appl. No.: 12/093,447

(22) PCT Filed: Nov. 6, 2006

(86) PCT No.: PCT/NL2006/050280
§ 371 (c)(1),
(2), (4) Date: Jun. 12, 2008

(87) PCT Pub. No.: WO2007/055576
PCT Pub. Date: May 18, 2007

(65) Prior Publication Data
US 2008/0303223 A1 Dec. 11, 2008

(30) Foreign Application Priority Data
Nov. 11, 2005 (NL) .................................... 1030404

(51) Int. Cl.
*F16L 21/08* (2006.01)
*F16L 21/04* (2006.01)

(52) U.S. Cl.
CPC *F16L 21/08* (2013.01); *F16L 21/04* (2013.01)

(58) Field of Classification Search
USPC ........... 285/95, 232, 104, 108, 335, 341, 342, 285/343, 113; 277/611, 616, 619, 589, 531
See application file for complete search history.

(56) References Cited

U.S. PATENT DOCUMENTS

| | | | | | |
|---|---|---|---|---|---|
| 216,038 | A | * | 6/1879 | Hewitt | 277/512 |
| 371,558 | A | * | 10/1887 | Dufresne | 285/148.3 |
| 1,277,976 | A | * | 9/1918 | Mann | 285/295.2 |
| 2,758,852 | A | * | 8/1956 | Newell | 285/343 |
| 2,772,100 | A | * | 11/1956 | Kreissig et al. | 285/93 |
| 2,779,610 | A | * | 1/1957 | Risley | 285/323 |
| 3,155,403 | A | * | 11/1964 | Schlicckmann | 285/111 |
| 3,606,348 | A | * | 9/1971 | Taylor | 277/328 |

(Continued)

FOREIGN PATENT DOCUMENTS

| | | |
|---|---|---|
| EP | 0690256 | 1/1996 |
| EP | 0794378 | 9/1997 |

(Continued)

*Primary Examiner* — Daniel P Stodola
*Assistant Examiner* — Zachary Dragicevich
(74) *Attorney, Agent, or Firm* — Peacock Myers, P.C.; Jeffrey D. Myers

(57) ABSTRACT

A coupling device for a tube includes a pressure element comprising first and second pressure element segments for exerting a clamping force on the tube. The pressure element includes surfaces that converge towards each other in a radial direction away from the tube and that are directly or indirectly disposed against support elements. The first pressure element segment is placed proximally and the second pressure element segment distally with respect to the tube. The first and the second pressure element segments are each provided with contact surfaces that abut and co-operate with each other at a predetermined incline in relation to the longitudinal axis of the tube such that during tension strain between the coupling and the tube, the first pressure element segment is caused to clamp the tube more tightly and the second pressure element segment endows an increased force on the support elements.

7 Claims, 2 Drawing Sheets

(56) References Cited

U.S. PATENT DOCUMENTS

| | | | |
|---|---|---|---|
| 4,119,335 A * | 10/1978 | Rieffle et al. | 285/337 |
| 4,886,304 A | 12/1989 | Kunsman | |
| 5,188,401 A * | 2/1993 | Staniforth | 285/322 |
| 5,803,513 A * | 9/1998 | Richardson | 285/342 |
| 6,019,396 A * | 2/2000 | Saito et al. | 285/3 |
| 6,257,628 B1 * | 7/2001 | Nijsen | 285/323 |
| 7,354,073 B2 * | 4/2008 | Sakamoto | 285/104 |
| 2003/0085566 A1 * | 5/2003 | Rex et al. | 285/104 |
| 2005/0230972 A1 | 10/2005 | Owen et al. | |

FOREIGN PATENT DOCUMENTS

| | | |
|---|---|---|
| JP | 10259890 | 9/1998 |
| WO | 90/07671 | 7/1990 |

* cited by examiner

COUPLING DEVICE FOR A TUBE

CROSS-REFERENCE TO RELATED APPLICATIONS

This is a United States National Phase Application under 35 U.S.C. §371 of International Patent Application No. PCT/NL2006/050280 filed Nov. 6, 2006, which claims the benefit of Dutch Patent Application No. NL 1030404, filed Nov. 11, 2005, all of which are incorporated by reference herein. The International Application was published on May 18, 2007 as WO 2007/055576 A1 under PCT Article 21(2).

FIELD

The present invention relates to a coupling device for a tube.

BACKGROUND

A coupling device is known from each of the Patent Abstracts of Japan volume 1998, no. 14 & JP no. 10/259890, and from the European patent specification EP-A-0 794 378.

In JP 10/259890 a sealing ring is used placed directly against a one-piece pressure ring, which pressure ring possesses surfaces that converge in a radial orientation towards each other.

In the coupling device known from EP-A-0 794 378 a sealing organ in the form of a rubber element is provided between on the one side the pressure element, and on the other side a support wall and the tube to be clamped. Furthermore, the pressure element of the prior art coupling device is provided with a friction-increasing surface on the side facing the tube.

When the coupling between the tube and the prior art coupling device comes under strain of tension, the fact that the support element is positioned at an incline, as a result of which it is under extra stress at the side of the pressure element, and will cause the sealing organ, due to the increased clamping force exerted by the pressure element on the tube, to provide an improved sealing action on said tube. The drawback is, however, that the sealing action of the sealing organ between the pressure element and the support element bearing less pressure and being located opposite the support element bearing extra pressure, will deteriorate.

SUMMARY

The present invention relates to a coupling device for a tube, comprising at least one pressure element for exerting a clamping force on the tube, wherein the same is provided with at least one sealing organ wherein, at the side facing away from the tube, the said at least one pressure element is embodied with surfaces that converge towards each other in a radial orientation away from the tube, and that further support elements are provided that can be coupled to each other and are designed to be placed directly or indirectly against said surfaces of the at least one pressure element, so as to provide the clamping force on the tube.

Said support elements are usually embodied as support walls; however, an embodiment with support edges providing a line contact is also useful. By way of explanation, the support elements will hereinafter be assumed to be embodied as support walls. The converging surfaces of the pressure element may be flat, concave or convex.

It is an object of the invention to provide a coupling device wherein this problem is avoided and with which advantages can be gained that will be explained below.

A further object is that the invention be applicable for coupling devices of various designs and embodiment. For example, the at least one pressure element used in the coupling device may be a one-piece ring to be placed around the tube. A construction for this purpose is known, for example, from the American patent specification U.S. Pat. No. 4,886,304.

It is, however, also possible to use a plurality of pressure elements that together form a ring around the tube such as known, for example, from the international patent specification WO 90/07671 and the European patent specification EP-B-0 690 256.

Another possibility is, of course, to use the pressure elements known from the European patent specification EP-A-0 794 378, the special construction of which has already been shown to be followed in practice.

A coupling device is known from WO 90/07671.

The coupling device according to WO 90/07671 has a first pressure element segment and a second pressure element segment, wherein the first pressure element segment is placed proximally and the second pressure element segment distally with respect to the tube, and wherein the first and the second pressure element segments are provided with contact surfaces placed to abut to, and co-operate with each other at a predetermined incline in relation to the longitudinal axis of the tube, and wherein the sealing organ is embodied as a sealing element, which is placed at least partly between a support element and the segmented pressure element on the one side, and on the other side the tube and the segmented pressure element.

The coupling device of the invention is embodied with contact surfaces whose incline is designed such that during tension strain between the coupling and the tube, the first pressure element segment is caused to clamp the tube more tightly and furthermore, that the tension strain between the coupling and the tube endows the second pressure element segment with an increased force on the support elements.

This construction of the coupling device according to the invention makes it possible during tension strain between the coupling and the tube that the sealing organ improves the sealing action in all respects.

A special embodiment of the coupling device according to the invention is characterized, in that a third pressure element segment is provided possessing at a first side a support element, and wherein at a second side opposite the first side both the first pressure element segment and the second pressure element segment are provided. This may produce a useful alternative for the above-discussed basic embodiment of the coupling device according to the invention.

It is desirable that when the tube is under tension strain, the second pressure element segment exert an increased force on the third pressure element segment.

With respect to the sealing element it is desirable that this be provided at least partly between a support element and the third pressure element segment on the one side and the tube and the third pressure element segment on the other side.

In all the possible embodiments of the coupling device according to the invention it is desirable that the first pressure element segment be provided with a projection limiting the movement of the second pressure element segment.

This projection is particularly useful for increasing the force that the co-operating support walls exert on the at least one pressure element. Due to the inclining contact surfaces of the separate pressure element segments, the absence of this projection could mean that the mutual positioning of these pressure element segments cannot be guaranteed.

For a further improvement of the effectiveness of the coupling device according to the invention it is further desirable that the first pressure element segment be embodied with a friction-increasing surface at the side facing towards the tube.

BRIEF DESCRIPTION OF THE DRAWINGS

Hereinafter the invention will be further elucidated by way of a number of exemplary embodiments of the coupling device according to the invention and with reference to the drawings, without limiting the patent claims.

The drawing shows in.

DETAILED DESCRIPTION

Figure 1:
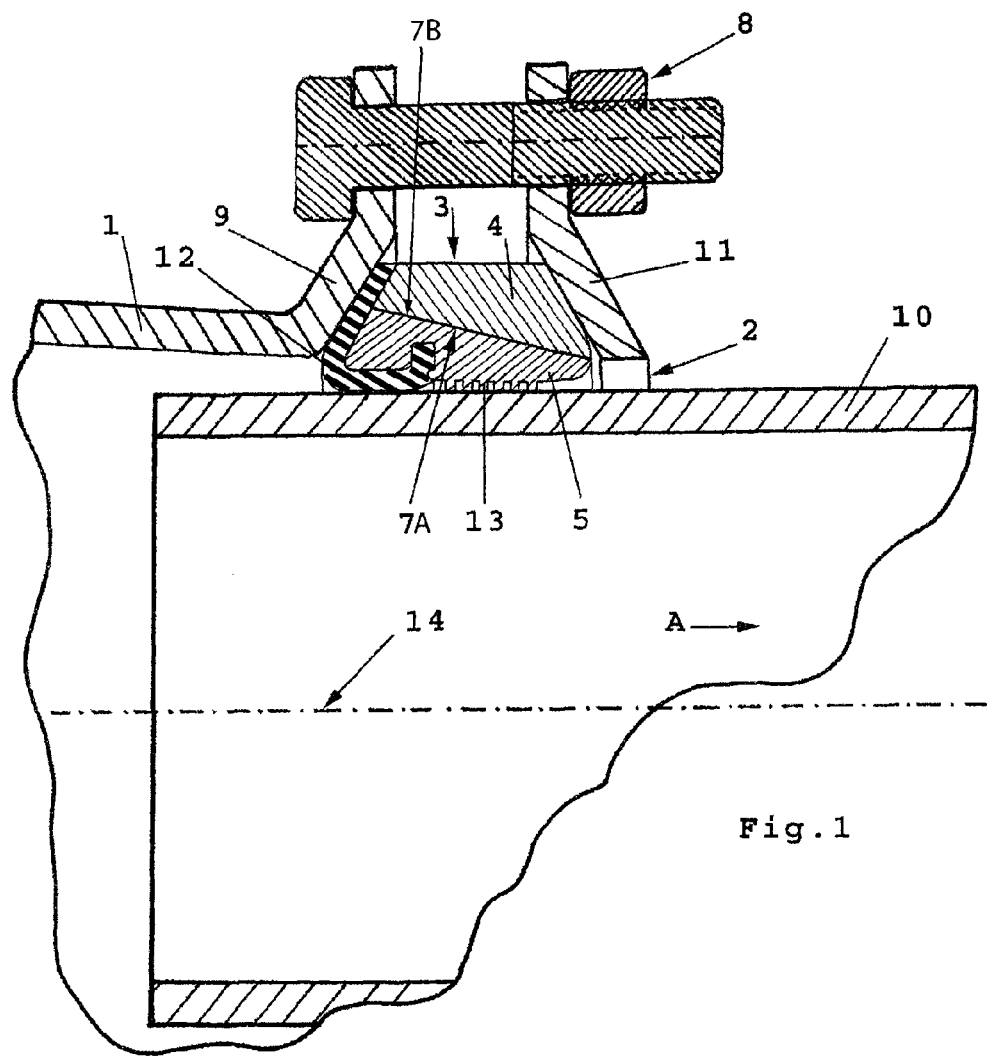
FIG. 1 a basic embodiment of the coupling device according to the invention, and FIG. 2 an alternative embodiment of the coupling device according to the invention.

Identical reference numerals in the figures refer to similar parts.

Figure 2:
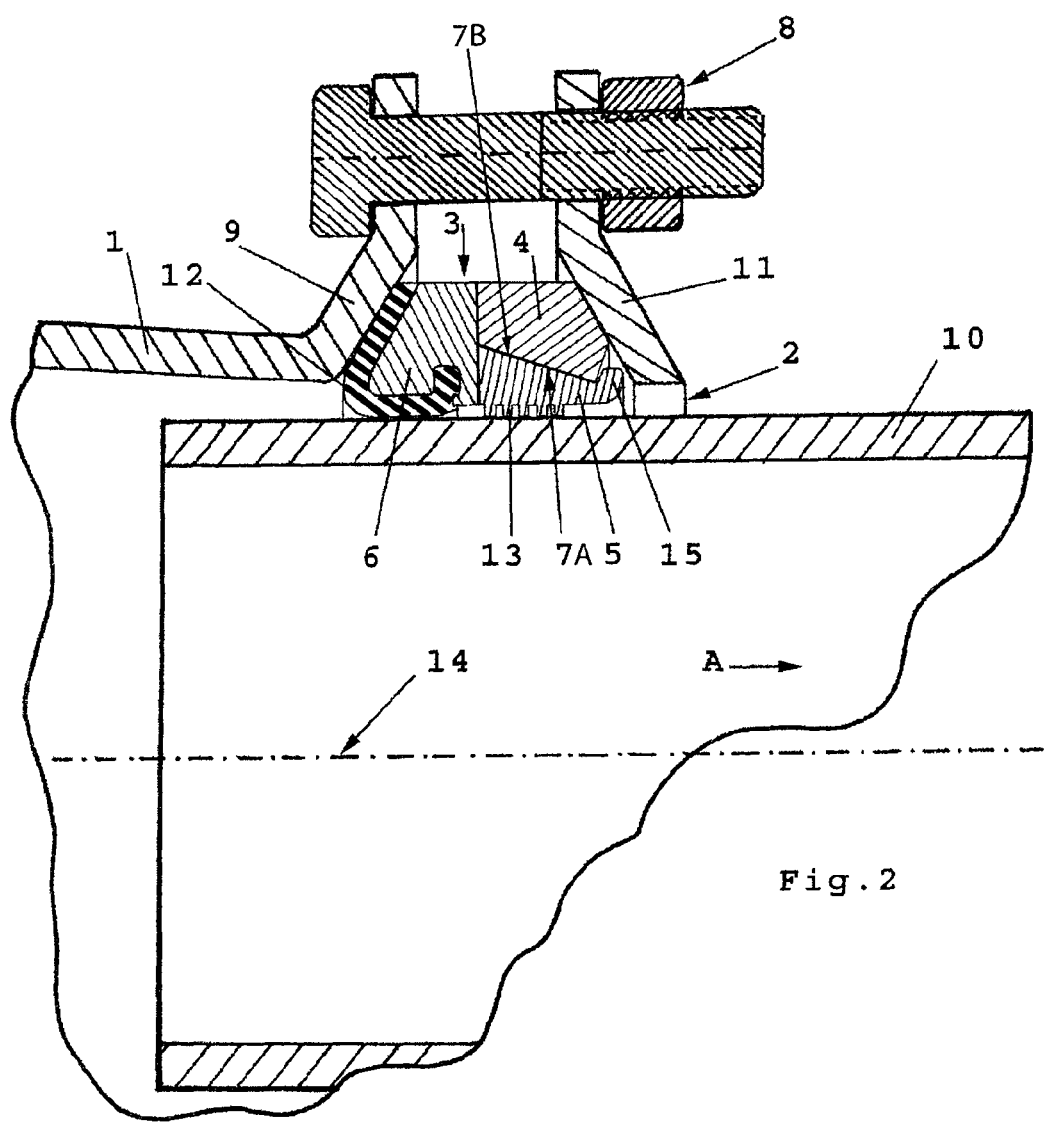

Referring both to FIG. 1 and FIG. 2, the first general embodiment of the coupling device according to the invention will now be elucidated.

The coupling device comprises a sleeve part 1 with an insert end 2 for the tube 10 and at least one pressure element 3 for exerting a clamping force on the tube 10. The pressure element 3 co-operates with a sealing organ 12, usually an element made of rubber, providing the actual seal around the tube 10.

At the side facing away from the tube, the at least one pressure element 3 is further provided with surfaces that converge in the radial direction, whose orientation corresponds to the orientation of the support walls 9 and 11. The converging surfaces of the pressure element 3 may be flat, concave or convex.

The above-mentioned support walls 9 and 11 can be mutually coupled by means of bolt and nut element 8, such that when this bolt and nut element 8 is tightened, the support walls 9 and 11 clampingly press the at least one pressure element 3 onto the tube 10.

Both FIG. 1 and FIG. 2 show that the at least one pressure element 3 is embodied in segments.

FIG. 1 shows the embodiment wherein the at least one pressure element 3 comprises a first pressure element segment 5 and a second pressure element segment 4, wherein the first pressure element segment 5 is proximally, and the second pressure element segment 4 is distally positioned with respect to the tube 10.

As clearly visible in FIG. 1 but also in FIG. 2, the first and the second pressure element segments 4, 5 are provided with co-operating contact surfaces 7a, 7b placed to abut to each other, which have a predetermined incline in respect to the longitudinal axis 14 of the tube 10.

FIG. 1 shows that the incline of the contact surfaces 7a, 7b is designed such that when the tube 10 is under tension strain in the direction of arrow A, the first pressure element segment 5 is caused to clamp the tube 10 more tightly.

The incline of the contact surfaces 7a, 7b is further designed such that when the tube 10 is under said tension strain in the direction of arrow A, the second pressure element segment 4 exerts an increased force on the support walls 9 and 11.

As already mentioned above, the sealing organ 12 is preferably embodied as rubber sealing element placed at least partly between a support wall 9 and the segmented pressure element 3 on the one side, and the tube 10 and the segmented pressure element 3 on the other side.

FIG. 2 shows an alternative embodiment of the coupling device according to the invention, wherein the same is embodied with a third pressure element segment 6. At a first side of this third pressure element 6 there is a support wall 9, while at a second side, opposite the first side of this third pressure element segment 6, the first pressure element segment 5 as well as the second pressure element segment 4 are provided.

As already explained with reference to FIG. 1, the incline of the contact surfaces 7a, 7b is in this embodiment also designed such that when the tube 10 is under tension strain in the direction of arrow A, the first pressure element segment 5 clamps the tube more tightly. In this case also, when the tube 10 is under tension strain, the second pressure element segment 4 will exert an increased force on the support walls 9, 11, but now partly through the third pressure element segment 6.

FIG. 2 shows a further preferred embodiment, wherein the first pressure element segment 5 possesses a projection 15 limiting the movement of the second pressure element segment 4.

Both in FIG. 1 and in FIG. 2 the first pressure element segment 5 is shown to be provided with a friction increasing surface 13 at the side facing towards the tube 10.

Within the frame of the invention the construction of the coupling device may be varied in several ways without departing from the spirit of the invention as specified in the appended claims.

It is, for example, completely obvious to the person skilled in the art that the friction-increasing surface 13 may be embodied as inlay or alternatively, that this friction-increasing surface 13 may form an integral part of the first pressure element segment 5.

The above given explanation by way of a number of exemplary embodiments of the coupling device according to the invention must therefore be understood as non-limiting with regard to the protective scope due the invention and specified in the appended claims.

The invention claimed is:

1. A coupling device for coupling with a tube, comprising:
   pressure element segments for exerting a clamping force on the tube, wherein a proximal pressure element segment is placed proximally with respect to the tube and a distal pressure element segment is placed distally with respect to the tube, wherein the proximal and distal pressure element segments are provided with contact surfaces placed to abut and cooperate with each other at a predetermined incline in relation to the longitudinal axis of the tube,
   wherein the distal pressure element segment has converging surfaces distant from the contact surfaces of the proximal and distal pressure element segments, which converge towards each other in a radial orientation away from the tube, and
   support elements that are placed directly or indirectly against said converging surfaces of the distal pressure element segment so as to provide the clamping force on the tube, and
   wherein at least one sealing organ including a sealing element is disposed at least partially between at least one of the support elements and said proximal pressure element segment and at least partially between the tube and said proximal pressure element segment,
   such that during tension strain between the coupling and the tube, said proximal pressure element segment is caused to clamp the sealing element between said proximal pressure element segment and the tube more tightly and said distal pressure element segment endows an increased force on the support elements.

2. The coupling device according to claim 1, wherein said proximal pressure element segment is provided with a projection limiting the movement of said distal pressure element segment.

3. The coupling device according to claim 1, wherein said proximal pressure element segment includes a friction-increasing surface adjacent the tube.

4. A coupling device for coupling with a tube, comprising:
pressure element segments for exerting a clamping force on the tube, wherein a proximal pressure element segment is placed proximally with respect to the tube, a distal pressure element segment is placed distally with respect to the tube, and a third pressure element segment is placed at a first side where one of the support elements is located and at a second side opposite the first side the third pressure element segment abuts both the proximal pressure element segment and the distal pressure element segment, wherein the proximal and distal pressure element segments are provided with contact surfaces placed to abut and cooperate with each other at a predetermined incline in relation to the longitudinal axis of the tube, wherein the distal pressure element segment and the third pressure element segment together have converging surfaces distant from the contact surfaces of the proximal and distal pressure element segments, which converge towards each other in a radial orientation away from the tube, and support elements that are placed directly or indirectly against said converging surfaces so as to provide the clamping force on the tube, and wherein at least one sealing organ including a sealing element is disposed at least partially between at least one of the support elements and said third pressure element segment and at least partially between the tube and said third pressure element segment, such that during tension strain between the coupling and the tube, said proximal pressure element segment is caused to clamp the sealing element between said proximal pressure element segment and the tube more tightly and said distal and third pressure element segments endow an increased force on the support elements.

5. The coupling device according to claim 4, wherein, when the tube is under tension strain, the distal pressure element segment exerts an increased force on the third pressure element segment.

6. The coupling device according to claim 4, wherein the proximal pressure element segment is provided with a projection limiting the movement of the distal pressure element segment.

7. The coupling device according to claim 4, wherein said proximal pressure element segment includes a friction-increasing surface adjacent the tube.

\* \* \* \* \*